United States Patent [19]

Kranz et al.

[11] 4,256,507
[45] Mar. 17, 1981

[54] PIGMENT FORMULATIONS

[75] Inventors: Joachim Kranz, Ludwigshafen; Rudolf Polster, Frankenthal; Reinhard Sappok, Heidelberg; Alois Wiesenberger, Lambsheim, all of Fed. Rep. of Germany

[73] Assignee: BASF Aktiengesellschaft, Ludwigshafen, Fed. Rep. of Germany

[21] Appl. No.: 116,382

[22] Filed: Jan. 29, 1980

[30] Foreign Application Priority Data

Feb. 10, 1979 [DE] Fed. Rep. of Germany ....... 2905114

[51] Int. Cl.³ .............................................. C09B 67/00
[52] U.S. Cl. ................................................ 106/288 Q
[58] Field of Search ................................... 106/288 Q

[56] References Cited

U.S. PATENT DOCUMENTS 3,785,769  1/1974  Rensfrew ................................ 8/659
4,150,025  4/1979  Shimada et al. ................. 106/288 Q

FOREIGN PATENT DOCUMENTS 1444730 11/1968 Fed. Rep. of Germany ...... 106/288 Q
52-111926  9/1977 Japan ................................. 106/288 Q
1085680 10/1967 United Kingdom .............. 106/288 Q

OTHER PUBLICATIONS

Chem. Abstracts, vol. 72, 1970, p. 70, 13815f.

*Primary Examiner*—James Poer

*Attorney, Agent, or Firm*—Oblon, Fisher, Spivak, McClelland & Maier

[57] ABSTRACT

Formulations of flavanthrone, pyranthrone, indanthrone, indigo, quinacridone, perylene-3,4,9,10-tetracarboxylic acid dianhydride and perylene-3,4,9,10-tetracarboxylic acid diimide pigments which contain, as additives, one or more compounds of the formula

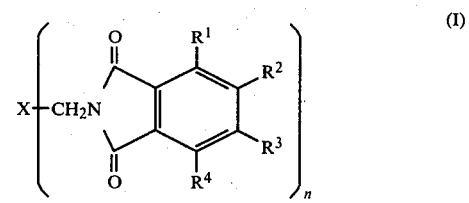

where X is an n-valent radical of a flavanthrone, pyranthrone, indigo, quinacridone, perylene-3,4,9,10-tetracarboxylic acid dianhydride or perylene-3,4,9,10-tetracarboxylic acid diimide pigment, $R^1$, $R^3$ and $R^4$ are hydrogen or chlorine, $R^2$ is hydrogen, chlorine, carboxyl, bromine, nitro, N-$C_1$-$C_5$-alkylcarbamyl, N-phenylcarbamyl or benzoylamino and n is 1, 2, 3 or 4.

In solutions of surface-coating binders or of surface coatings, the above formulations give very deep colorations, coupled with high gloss and high transparency of the resulting films.

8 Claims, No Drawings

PIGMENT FORMULATIONS

The present invention relates to novel pigment formulations for paints.

The novel formulations of pigments based on flavanthrone, pyranthrone, indanthrone, indigo, quinacridone, perylene-3,4,9,10-tetracarboxylic acid dianhydride and perylene-3,4,9,10-tetracarboxylic acid diimide contain one or more compounds of the general formula

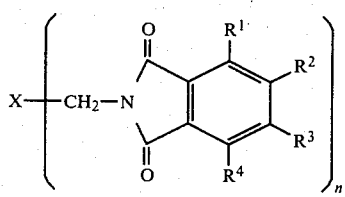

where X is an n-valent radical of a flavanthrone, pyranthrone, indigo, quinacridone, perylene-3,4,9,10-tetracarboxylic acid dianhydride or perylene-3,4,9,10-tetracarboxylic acid diimide pigment, $R^1$, $R^3$ and $R^4$ are hydrogen or chlorine, $R^2$ is hydrogen, chlorine, carboxyl, bromine, nitro, N-$C_1$-$C_5$-alkylcarbamyl, N-phenylcarbamyl or benzoylamino and n is 1, 2, 3 or 4.

In solutions of surface-coating binders, the formulations according to the invention give very deep colorations coupled with high gloss and high transparency of the resulting films. The content of compounds of the formula I, hereafter also referred to as additives, is as a rule from 0.5 to 15% by weight, based on pigment, preferably from 1 to 10% by weight, and in particular from 3 to 6% by weight.

In the formulations according to the invention, the additives of the formula I may be derived from the pigment present in the formulation or from another compound selected from the above pigment categories. In each case, the additive results in an improvement in the gloss and transparency of the colored film. However, if the additives are derived from a pigment which differs chemically from the pigment in the formulation, it can result in a shift in hue.

Hence, for tinctorial reasons, preferred pigment formulations are those where the additive of the formula I is derived from the chemical compound present as the pigment in the formulation, or from a derivative of this pigment.

The formulations according to the invention can be prepared, for example, by milling the components in a ball mill. This treatment may or may not be followed by conditioning of the finely divided, milled crude pigment to convert it to a pigmentary form. Since this conditioning in many cases also occurs when the crude pigment is worked into the solution of the surface-coating binder, a special conditioning of the milled, finely divided crude pigment is often not necessary. Alternatively, the formulation may be prepared in the course of the conditioning stage. In that case, the milled, finely divided crude pigment is mixed with the corresponding compound (I) and the pigment contained in the mixture is converted to the pigmentary form in a conventional manner. The pigment formulation according to the invention can also be prepared by incorporating the pigment and the desired compound (I) into the surface-coating binder. In each case, the formulation obtained gives the same good result, namely deep colorations, with high gloss and high transparency of the resulting films.

Specific examples of phthalimidomethylene radicals of the formula

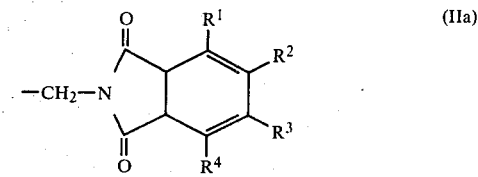

are those derived from phthalimide, 4-chlorophthalimide, 4-bromophthalimide, tetrachlorophthalimide, 4-carboxyphthalimide, 4-benzoylaminophthalimide, 4-N-butylcarbamylphthalimide, 4-N-methylcarbamylphthalimide, 4-N-ethylcarbamylphthalimide, 4-N-propylcarbamylphthalimide, 4-nitrophthalimide, 4-tert.-butylphthalimide and mixtures of these.

For tinctorial and economic reasons, preferred compounds I are those where the phthalimidomethylene radical is derived from phthalimide which does not carry further substituents.

The compounds of the formula I are obtained by a conventional method, ie. by condensing X(H)$_n$ with the corresponding phthalimide (II) and paraformaldehyde or with the corresponding N-methylolphthalimide in the presence of a condensing agent. Preferred condensing agents are sulfuric acid of 80–100% strength by weight or oleum of up to 10% strength by weight. These agents at the same time also serve as a reaction medium. The condensation product is then precipitated by pouring the sulfuric acid solution into water or ice/water and is isolated in a conventional manner by filtration and washing neutral.

THe Examples which follow illustrate the invention. In the Examples, percentages are by weight.

V. The pigment formulations according to the invention were assessed tinctorially in a baking finish. The finishes requied were in every case prepared as follows:

V. 1. Colored finish 5 g of a pigment formulation (or pigment) and 95 g of a baking finish based on a 35% strength solution of an alkyd resin/melamine resin in xylene are introduced into a 250 ml polyethylene beaker. After adding 100 ml of glass beads of 3 mm diameter, the mixture is dispersed for 1 hour on a shaker (®RED DEVIL). The glass beads are removed from the colored finish by sieving.

V. 2. Full-shade finish for full-shade colorations 5 g of the colored finish from V.1. are mixed homogeneously with 5 g of clear finish. The full-shade finish V.2. is coated onto cardboard, printed with a contrast pattern, by means of a 150 μm spiral coater. After air-drying for 20 minutes the coating is baked for 15 minutes at 120° C.

V. 3. White reduction finish 4 g of the colored finish V.1. are homogeneously mixed with 12.5 g of white finish (containing 40% of titanium dioxide). The resulting white reduction finish V.3. is coated onto cardboard with a 150 μm spiral coater and the coating is air-dried for 20 minutes and then baked at 120° C. for 15 minutes.

VI. The coloration was assessed as follows:

(VI.1) In the full-shade coating by visual assessment of gloss, lightness of color and/or transparency (VI.2) In the white reduction, colorimetrically by the FIAF method, to determine the tinctorial strength, the hue (T) and the purity (saturation) (S) relative to a standard (L. Gall, Farbe+Lack 75 (1969), 854–862).

The tinctorial strength was expressed relative to a value of 100 for the standard. Differences in hue (ΔT) and in purity (ΔS) of as little as 0.04 are clearly detectable visually.

The compounds of the formula I used to prepare the pigment formulations according to the invention were themselves prepared as follows:

EXAMPLE A

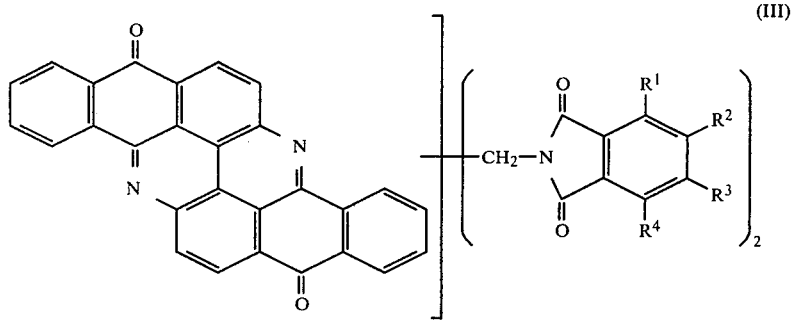

(AI) III R¹, R², R³ and R⁴=H

A mixture of 204 g (=0.5 mole) of flavanthrone, 33 g of paraformaldehyde and 155 g of phthalimide is introduced into 1,800 g of 6% strength oleum and the batch is stirred for 6 hours at 90° C. It is then poured out into ice/water and the product is isolated.

Yield: 340 g (corresponding to 94% of theory) of a yellowish brown to orange powder.

(A2) III R¹, R³ and R⁴=H; R²=—Cl

A mixture of 41 g (=0.1 mole) of flavanthrone, 7 g of paraformaldehyde and 37 g of 4-chlorophthalimide is introduced into 600 g of 98% strength sulfuric acid and the batch is kept at 80° C. for 5 hours. It is then poured into ice water and the product is isolated in a conventional manner.

Yield: 73 g of an ocher powder.

(A3) III R²=—COOH; R¹, R³ and R⁴=H

The procedure described for (A2) is followed, but 45 g of ammonium phthalimidocarboxylate are used.

Yield: 74 g of an ocher powder.

(A4) III R¹, R², R³ and R⁴=Cl

The procedure described for (A2) is followed, but 65 g of tetrachlorophthalimide are used.

Yield: 95 g of an ocher powder.

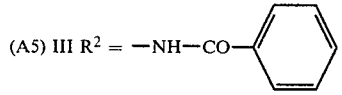

R¹, R³ and R⁴=H

The procedure described for (A2) is followed, but 60 g of 4-benzoylaminophthalimide are used.

Yield: 90 g of an orange yellow powder.

EXAMPLE B

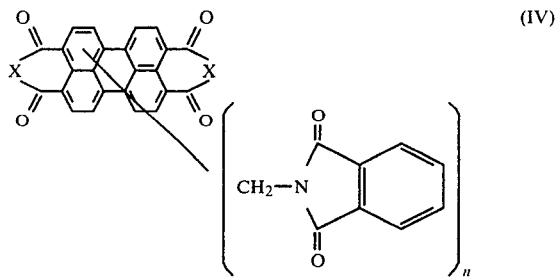

(B1) IV X=—O—; n=4

A mixture of 40 g of perylene-3,4,9,10-tetracarboxylic acid anhydride and 72 g of N-methylolphthalimide (molar ratio about 1:4) is introduced into 720 g of 6% strength oleum and the reaction mixture is kept at 100° C. for 4 hours. It is then precipitated by pouring into ice water and the condensation product is isolated in a conventional manner.

Yield: 102 g of a reddish brown powder ≐99% of theory.

(B2) IV X=>N—H; n=4

78 g of perylenetetracarboxylic acid diimide, 24 g of paraformaldehyde and 118 g of phthalimide (0.8 mole of each of the last two are introduced into 1,000 g of 100% strength sulfuric acid and the condensation is completed at 60° C. (duration: 4 hours). The mixture is then worked up as described for B1).

Yield: 199 g of a reddish brown powder (≐97% of theory).

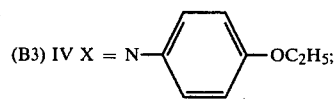

n=3

55 g of N-methylolphthalimide (0.3 mole) are added to a solution of 63 g of perylenetetracarboxylic acid bis-phenetidide (=0.1 mole) in 720 g of 96% strength sulfuric acid and the mixture is kept at 60° C. for 4 hours. After working up as described in B1), 108 g of a reddish brown powder (≐97% of theory) are obtained.

EXAMPLE C

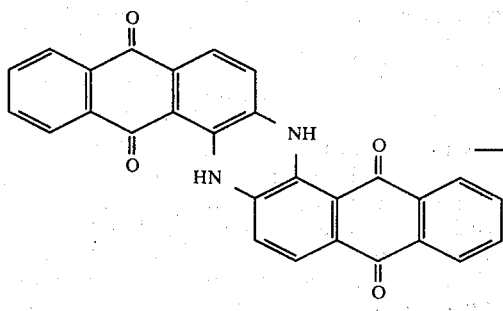 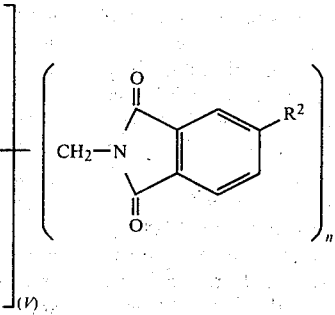

(C1) V R$^2$=H, n=4

221 g (0.5 mole) of indanthrone and 360 g (2 moles of N-methylolphthalimide are introduced into 2,300 g of 3% strength oleum and the mixture is condensed for 4 hours at 60° C. It is then poured into ice water and the condensation product is isolated in a conventional manner.

Yield: 522 g of a dark blue powder (=96% of theory).

(C2) V R$^2$=—CONH—C$_4$H$_9$(n); n=2

A mixture of 23 g (0.05 mole) of indanthrone, 6 g of paraformaldehyde and 30 g of 4-(butylcarbamyl)phthalimide (0.2 mole of each) is introduced into 460 g of 3% strength oleum and the mixture is condensed for 4 hours at 60° C. It is then worked up in a conventional manner.

Yield: 46 g of a blue powder (=92% theory).

EXAMPLE D

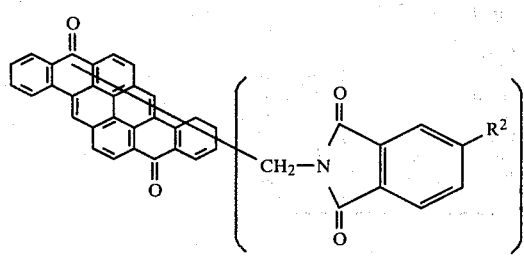

(D1) VI R$^2$=H 203 g (0.5 mole) of pyranthrone and 270 g (1.5 moles) of N-methylolphthalimide are introduced into 2,300 g of 3% strength oleum and the mixture is stirred for 3 hours at 60° C. It is then poured out into ice water and the condensation product is isolated in a conventional manner.

Yield: 430 g of a yellowish brown powder (=97% of theory).

(D2) VI R$^2$=—NO$_2$ 20 g (0.05 mole) of pyranthrone, 6 g of paraformaldehyde and 40 g of 4-nitrophthalimide (0.2 mole of each) are introduced into 400 g of 3% strength oleum and condensed at 60° C. for 3 hours. After conventional working up, 45 g of a brown powder (=88% of theory) are obtained.

EXAMPLE E

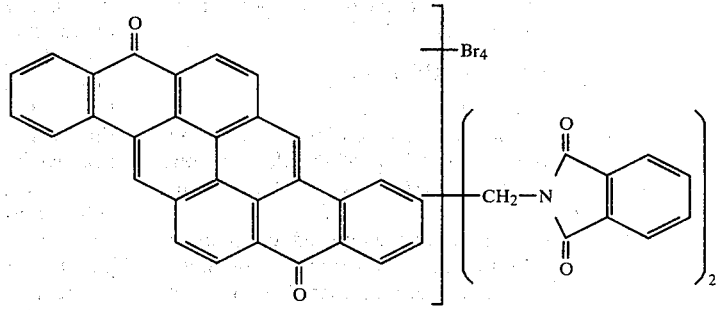

180 g (0.25 mole) of tetrabromopyranthrone and 100 g (0.56 mole) of N-methylolphthalimide are introduced into 1,000 g of 6% strength oleum and condensed for 3 hours at 80° C. The mixture is then worked up in a conventional manner.

Yield: 250 g of a red powder (=96% of theory).

EXAMPLE F

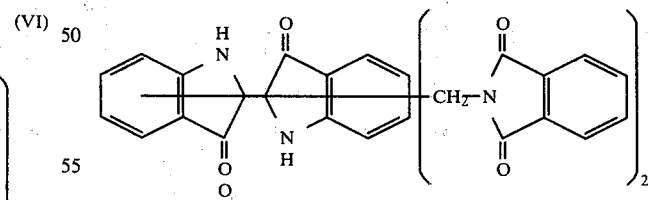

131 g (0.5 mole) of indigo and 355 g (2.0 moles) of N-methylolphthalimide are introduced into 2,400 g of 96% strength sulfuric acid and condensed for 3 hours at 80° C. The mixture is worked up in a conventional manner.

Yield: 432 g of a blue powder (=96% of theory)

EXAMPLE 1

(a) 100 g of flavanthrone pigment (obtained by the process described under (c) and 1 g of the flavanthrone derivative prepared according to Example (A1) (formula III, $R^1$, $R^2$, $R^3$ and $R^4=H$) are homogeneously dry-blended.

(b) Using this formulation, full shade coatings and white reduction coatings are prepared as described in (V.2) and (V.3) and these are compared tinctorially with corresponding colorations obtained with the individual pigments used to prepare the above formulation. (The tinctorial assessments, as described in (VI.1) and (VI.2), are summarized in Table 1.)

(c) Preparation of the flavanthrone pigment

A mixture of 250 kg of crude flavanthrone, 1,500 kg of sodium chloride and 7.5 kg of trichlorobenzene is milled for 30 hours at about 90° C. in a 10 m³ ball mill charged with 15.5 tonnes of iron balls of 20–25 mm diameter. The milled material is introduced into water and filtered whilst warm, and the filter residue is washed salt-free, dried and milled to a powder.

EXAMPLES 2 and 3

(a) The procedure followed is as in Example (1a), but to prepare the formulation Y g of the flavanthrone derivative prepared as described in Example (A1) are used. The amounts Y are shown in Table 1.

(b) Coatings are produced with the formulations by the methods in (V.2) and (V.3). The tinctorial assessment of the resulting colorations by the methods of (VI.1) and (VI.2) are shown in Table 1.

EXAMPLES 4 TO 8

(a) Preparation of the formulation 100 g of the flavanthrone pigment prepared as described in Example (1b) and Y g of the flavanthrone derivatives of the formula III shown in Table 1 are mixed homogeneously.

(b) Full shade colorations and white reduction colorations are prepared with the formulations by the methods of (V.2) and (V.3), and are compared with colorations prepared from the pigment obtained as described in Example (1b). The tinctorial assessments by the methods of (VI.1) and (VI.2) are shown in Table 1.

EXAMPLE 9

(a) Preparation of the formulation 300 kg of crude flavanthrone and 15 kg of the flavanthrone derivative prepared as described in Example (A1) (formula III, $R^1$, $R^2$, $R^3$ and $R^4=H$) are milled for 25 hours in a 2 m³ ball mill.

Using the resulting milled material, full shade colorations and white reduction colorations are prepared by the methods of (V.2) and (V.3). The colorations are compared with colorations obtained with the milled material from Example (10c). The tinctorial assessment by the methods of (VI.1) and (VI.2) is shown in Table 2.

EXAMPLE 10

(a) Preparation of the formulation 100 g of the milled product obtained as described in (c) below and 5 g of the flavanthrone derivative obtained as described in Example (A1) (formula III, $R^1$, $R^2$, $R^3$ and $R^4=H$) are mixed homogeneously.

(b) Using the resulting mixture of (a), full shade colorations and white reduction colorations are prepared by the methods of (V.2) and (V.3) and compared, in respect of tinctorial properties, with corresponding colorations obtained with the milled product prepared as described in (c). The results of the comparison are shown in Table 2.

(c) The milled product used in (a) and (b) is obtained by milling 300 kg of crude flavanthrone with 3 tonnes of iron balls (20–25 mm diameter) in a 2 m³ ball mill for 25 hours.

EXAMPLE 11

(a) Preparation of the formulation 100 g of the milled flavanthrone obtained as described in Example (10c) and 5 g of the flavanthrone derivative obtained as described in Example (A1) (III, $R^1$, $R^2$, $R^3$ and $R^4=H$) are introduced into a mixture of 240 g of butan-2-one and 200 g of water and the suspension is kept at the boil for 5 hours. The butanone is then distilled off as an azeotrope with water and the pigment is isolated from the aqueous suspension and dried.

(b) Using the formulation thus obtained, full shade colorations and white reduction colorations are prepared by the methods of (V.2) and (V.3) and are compared with colorations obtained with the flavanthrone pigment prepared as described in Example (12c). The tinctorial comparison by the methods of (VI.1) and (VI.2) is shown in Table 2.

EXAMPLE 12

(a) Preparation of the formulation 100 g of the flavanthrone pigment prepared as described in (c) below and 5 g of the flavanthrone derivative prepared as described in (A1) (III, $R^1$, $R^2$, $R^3$ and $R^4=H$) are mixed homogeneously.

(b) Full shade colorations and white reduction colorations are prepared with this formulation and are compared with colorations which are obtained with the

TABLE 1

| Example | Y [g] | Additive Compound from Example | CE* | White reduction coloration ΔT | ΔS | Full-shade coloration Hue | Transparency |
|---------|-------|-------------------------------|-----|-------------------------------|------|--------------------------|---------------|
| Comparison | 0 | — | 100 | T = 2.55 | S = 4.56 | (Comparison) | |
| 1 | 1 | (A1) | 91 | −0.07 somewhat | +0.01 | a trace darker | somewhat more transparent |
| 2 | 3 | (A1) | 78 | −0.18 | +0.02 | slightly darker | |
| 3 | 5 | (A1) | 75 | −0.22 | +0.02 | } darker | } |
| 4 | 7 | (A1) | 75 | −0.22 distinctly | +0.02 | | |
| 5 | 5 | (A2) | 71 | −0.25 | +0.06 | | distinctly more transparent than Comparison |
| 6 | 5 | (A3) | 74 | −0.25 | +0.07 | } slightly | |
| 7 | 5 | (A4) | 84 | −0.13 | +0.04 | darker | |
| 8 | 5 | (A5) | 96 | −0.04 slightly greener than Comparison | +0.03 | a trace darker than Comparison | than Comparison |

*CE = color equivalent pigment prepared according to (c) below (without addition of (I)). The comparison by the methods of (VI.1) and (VI.2) is shown in Table 2.

(c) Flavanthrone pigment 100 g of the milled product obtained as described in Example (10c) are introduced into a mixture of 240 g of butan-2-one and 200 g of water and the suspension is kept at the boil for 5 hours. The butan-2-one is then distilled off as an azeotrope with water, and the pigment is isolated from the aqueous suspension and dried.

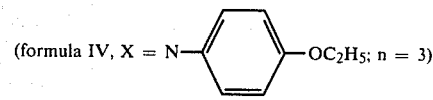

(formula IV, $X = N-\langle\underset{=}{\phantom{o}}\rangle-OC_2H_5$; n = 3)

are introduced into a mixture of 240 g of butan-2-one and 200 g of water and the suspension is refluxed for 5 hours. The ketone is then distilled off with water, the aqueous suspension is filtered and the filter residue is

TABLE 2

| Example | Y [g] | Additive Compound from Example | Tinctorial characteristics | | | | |
|---|---|---|---|---|---|---|---|
| | | | White reduction coloration | | | Full-shade coloration | |
| | | | CE | ΔT | ΔS | Hue | Transparency |
| Comparison 9 | 0 | — | 100 | T = 2.47 | S = 4.62 | (Comparison) | |
| | 5 | (A1) | 91 | −0.05 | +0.03 | a trace lighter | distinctly more transparent than Comparison |
| 10 | 5 | (A1) | 92 | −0.10 | −0.02 | | |
| Comparison 11 | 0 | — | 100 | T = 2.60 | S = 4.60 | (Comparison) | |
| | 5 | (A1) | 84 | −0.16 | −0.02 | slightly darker | distinctly more transparent than Comparison |
| 12 | 5 | (A1) | 85 | −0.21 | 0.00 | | |

EXAMPLE 13

(a) Preparation of the formulation 100 g of finely divided perylene-3,4,9,10-tetracarboxylic acid dianhydride (which has been obtained by milling in a ball mill for 30 hours) and 5 g of the perylene derivative prepared as described in Example (B1) (formula IV, X=—O—; n=4) are introduced into 1,000 g of 90% strength sulfuric acid and the mixture is stirred at room temperature, in the course of which it thickens. After 15 hours, the sulfuric acid mixture is poured out into 5,000 g of water at 50° C. and the suspension is filtered. The filter residue is washed neutral and dried at 80° C.

(b) Full shade colorations and white reduction colorations are prepared by the methods of (V.2) and (V.3) with the pigment formulation obtained above and these are compared with colorations which were prepared with a pigment obtained by the process described uner (a), but in the absence of the perylene derivative. The formulation is more transparent in a full-shade coloration, and distinctly more yellow in hue in a white reduction, and also gives a higher color saturation and has a greater tinctorial strength. Furthermore, the formulation obtained as described in (a) is more dispersible.

| | CE | T | S | Transparency |
|---|---|---|---|---|
| Comparison | 100 | 8.91 | 2.99 | (Comparison) |
| Formulation (a) | 92 | 8.66 | 3.04 | more transparent than Comparison |

EXAMMPLE 14

(a) Preparation of the formulation 100 g of finely divided Pigment Red 123, C.I. No. 71,145 (obtained by milling crude Pigment Red 123 for 35 hours in a ball mill in the absence of a grinding medium) and 6 g of the perylene derivative obtained as described in Example (B3)

dried and comminuted to a powder.

(b) Full shade colorations and white reduction colorations are prepared with this formulation by the methods of (V.2) and (V.3). These are compared with colorations obtained with the comparison pigment obtained as described in (c) below.

| | CE | T | S | Transparency |
|---|---|---|---|---|
| Comparison (c) | 100 | 8.91 | 3.20 | (Comparison) |
| According to the invention | 94 | 8.74 | 3.24 | distinctly more transparent than Comparison |
| | | distinctly more yellow than Comparison | somewhat purer than Comparison | |

The same result is obtained if crude Pigment Red 123, C.I. No. 71,145 is milled with 6% of the perylene derivative of Example (B3) for 35 hours in a ball mill and the milled material is then conditioned as described in (a).

(c) Comparison pigment 100 g of the finely divided Pigment Red 123 used in (a) are conditioned as described under (a) but without addition of the perylene derivative, worked up, isolated and dried.

EXAMPLE 15

(a) Preparation of the formulation 100 g of Pigment Brown 26, C.I. 71,129 prepared as described in (c) below are mixed homogeneously with 5 g of the perylene derivative of Example (B2).

(b) Full shade colorations and white reduction colorations are prepared with the formulation by the methods of (V.2) and (V.3). These are compared with colorations obtained with the pigment from (c) below.

| | CE | T | S | Transparency |
|---|---|---|---|---|
| Comparison (c) | 100 | 11.25 | 2.01 | (Comparison) |
| According to the invention | 96 | 11.10 distinctly more yellow than Comparison | 2.02 like Comparison | distinctly more transparent than Comparison |

(c) Preparation of the pigment 1,100 kg of crude perylene-3,4,9,10-tertracarboxylic acid diimide are milled for 30 hours at 80° C., in the absence of salt, in a 10 m³ ball mill (charged with 15.5 tonnes of iron balls of 20–25 mm diameter). The milled material is introduced into a 3-fold amount by weight of liquid phenol and the mixture is stirred for 3 hours at 180° C. The phenol is then dissolved at 80°–100° C. by adding sodium hydroxide solution and the pigment suspension is filtered. The filter residue is washed free from phenol, phenolate and sodium hydroxide and is dried.

EXAMPLE 16

(a1) Preparation of the formulation 100 g of Pigment Blue 60, C.I. No. 69,800, prepared as described in (c), and 5 g of the indanthrone derivative obtained as described in Example (C1) are mixed homogeneously.

(a2) Preparation of the formulation 100 g of the pigment prepared as described in (c) below and 10 g of the indanthrone derivative prepared as in Example (C2) are mixed homogeneously.

(b) Full shade colorations and white reduction colorations are prepared with the formulations by the methods of (V.2) and (V.3) and these are compared with colorations using the pigment obtained as described in (c) below.

| | CE | T | S | Transparency |
|---|---|---|---|---|
| Comparison (c) | 100 | 16.92 | 3.20 | (Comparison) |
| Formulation (a1) | 96 | 16.97 | 3.28 | more transparent than Comparison |
| Formulation (a2) | 87 | 16.95 somewhat greener than Comparison | 3.29 purer than Comparison | |

(c) 100 g of finely divided crude indanthrone (obtained by milling crude Pigment Blue 60 for 24 hours in a ball mill in the absence of a grinding medium) are introduced into a mixture of 240 g of butan-2-one and 200 g of water and the suspension is refluxed for 5 hours. The ketone is then distilled off as an azeotropic mixture with water and the pigment is isolated from the aqueous suspension and dried.

EXAMPLE 17

(a1) Preparation of the formulation 100 g of finely divided crude 6,14-dichloropyranthrone (prepared by milling crude 6,14-dichloropyranthrone for 24 hours in a ball mill) and 5 g of the pyranthrone derivative prepared as described in Example (D1) are introduced into 300 g of N-methylpyrrolidone and the mixture is stirred for 3 hours at 70° C. It is then diluted with warm water and the pigment is separated off, washed free from N-methylpyrrolidone and dried.

(a2) Preparation of the formulation

The procedure followed is as described in (a1), except that 5 g of the pyranthrone derivative prepared as described in Example (D2) are used.

(b) Full shade colorations and white reduction colorations are prepared with formulations (a1) and (a2) by the methods of (V.2) and (V.3) and are compared with colorations of the comparison pigment obtained as described in (c) below.

| | CE | T | S | Transparency |
|---|---|---|---|---|
| Comparison (C) | 100 | 4.48 | 4.24 | (Comparison) |
| Formulation (a1) | 91 | 4.12 | 4.27 | distinctly more transparent than Comparison |
| Formulation (a2) | 90 | 4.26 substantially more yellow than Comparison | 4.30 purer than Comparison | |

(c) The comparison pigment is prepared as described under (a1) but in the absence of the compound from Example (D1).

EXAMPLE 18

(a1) Preparation of the formulatin

A mixture of crude flavanthrone and 5%, based on the latter, of the pyranthrone derivative prepared as described in Example (D1) is milled for 30 hours in a ball mill in the absence of a grinding medium.

(a2) Preparation of the formulation 100 g of the flavanthrone pigment obtained as described in Example (1c) and 5 g of the pyranthrone derivative prepared as described in Example (D1) are mixed homogeneously.

(b) Full shade colorations and white reduction colorations are prepared with formulations (a1) and (a2) by the methods of (V.2) and (V.3) and compared with corresponding colorations obtained with the pigment of Example (1c).

| | CE | T | S | Transparency |
|---|---|---|---|---|
| Comparison (1c) | 100 | 2.55 | 4.56 | Comparison |
| Formulation (a1) | 89 | 2.45 | 4.52 | distinctly more transparent than Comparison |
| Formulation (a2) | 73 | 2.40 yellower than Comparison | 4.54 less dull than Comparison | |

EXAMPLE 19

(a1) Preparation of the formulation 100 g of flavanthrone pigment from Example (1c) and 5 g of the pyranthrone derivative prepared as described in Example (D2) are mixed homogeneously.

(a2) Preparation of the formulation 100 g of flavanthrone pigment from Example (1c) and 5 g of the pyranthrone derivative prepared as described in Example E are mixed homogeneously.

(b) Full shade colorations and white reduction colorations are prepared with the formulations by the methods of (V.2) and (V.3) and compared with corresponding colorations obtained with the pigment of Example (1c).

|  | CE | T | S | Transparency |
|---|---|---|---|---|
| Comparison (1c) | 100 | 2.55 | 4.56 | (Comparison) |
| Formulation (a1) | 85 | 2.43 | 4.60 | distinctly more transparent than Comparison |
| Formulation (a2) | 96 | 2.99+ | 4.40 | |

*The additive causes a shift toward red.

EXAMPLE 20

(a) Preparation of the formulation

The formulation is prepared as described in Example 17 (a1), except that 5 g of the pyranthrone derivative prepared as described in Example E are used instead of the derivative prepared as described in Example (D1).

(b) Full shade colorations and white reduction colorations are prepared with the formulation by the methods of (V.2) and (V.3). These are compared with colorations obtained with the pigment from Example 17(c).

|  | CE | T | S | Transparency |
|---|---|---|---|---|
| Comparison (17c) | 100 | 4.48 | 4.24 | (Comparison) |
| Formulation (a) | 98 | 4.70+ | 4.06 | distinctly more transparent than Comparison |

EXAMPLE 21

(a) Preparation of the formulation 100 g of Pigment Blue 60, C.I. No. 69,800, obtained as described in Example (16c), and 10 g of the indigo derivative prepared as described in Example F, are mixed homogeneously.

(b) Colorations are prepared from the formulation by the methods of (V.2) and (V.3) and are compared with colorations obtained using the pigment from Example (16c).

|  | CE | T | S | Transparency |
|---|---|---|---|---|
| Comparison (16c) | 100 | 16.92 | 3.20 | (Comparison) |
| Formulation (a) | 96 | 16.99 | 3.24 | more transparent than Comparison |

We claim:

1. A formulation of a flavanthrone, pyranthrone, indanthrone, indigo, quinacridone, perylene-3,4,9,10-tetracarboxylic acid dianhydride or perylene-3,4,9,10-tetracarboxylic acid diimide pigment which contains from 0.5 to 15% by weight, based on pigment, of one or more compounds of the general formula

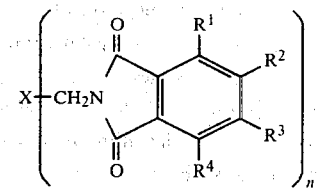 (I)

where X is an n-valent radical of a flavanthrone, pyranthrone, indigo, quinacridone, perylene-3,4,9,10-tetracarboxylic acid dianhydride or perylene-3,4,9,10-tetracarboxylic acid diimide pigment, $R^1$, $R^3$ and $R^4$ independently of one another are hydrogen or chlorine, $R^2$ is hydrogen, chlorine, carboxyl, bromine, nitro, N-$C_1$-$C_5$-alkylcarbamyl, N-phenylcarbamyl or benzoylamino and n is 1, 2, 3 or 4.

2. A formulation as claimed in claim 1, which contains from 1 to 10% by weight, based on pigment, of one or more compounds of the formula I.

3. A formulation as claimed in claim 1, which contains from 3 to 6% by weight, based on pigment, of one or more compounds of the formula I.

4. A formulation as claimed in claim 1 or 2 or 3, wherein X is derived from the chemical compound present as the pigment in the formulation, or from a derivative of this compound.

5. A formulation as claimed in claim 1, wherein the radical

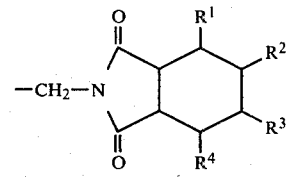

is derived from phthalimide, 4-chlorophthalimide, 4-bromophthalimide, tetrachlorophthalimide, 4-carboxyphthalimide, 4-benzoylaminophthalimide, 4-N-butylcarbamylphthalimide, N-methylcarbamylphthalimide, 4-N-ethylcarbamylphthalimide, 4-N-propylcarbamylphthalimide, 4-nitrophthalimide, 4-tert.-butylphthalimide or mixtures of these .

6. A pigment formulation as claimed in claim 1 or 4, wherein the radical

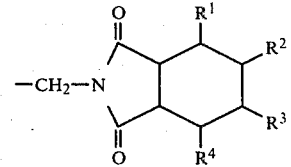

is derived from phthalimide.

7. A formulation as claimed in claim 4, wherein the radical

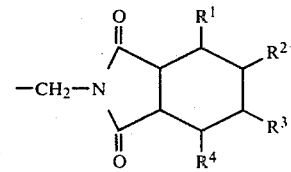

is derived from phthalimide, 4-chlorophthalimide, 4-bromophthalimide, tetrachlorophthalimide, 4-carboxyphthalimide, 4-benzoylaminophthalimide, 4-N-butylcarbamylphthalimide, N-methylcarbamylphthalimide, 4-N-ethylcarbamylphthalimide, 4-N-propylcarbamylphthalimide, 4-nitrophthalimide, 4-tert.-butylphthalimide or mixtures of these.

8. A formulation as claimed in claim 4, wherein the radical

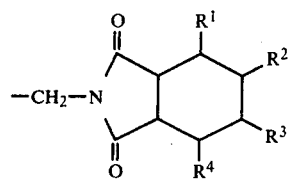

is derived from phthalimide.

* * * * *